(No Model.) 2 Sheets—Sheet 1.
G. R. THOMSON.
DISK HARROW.
No. 352,210. Patented Nov. 9, 1886.
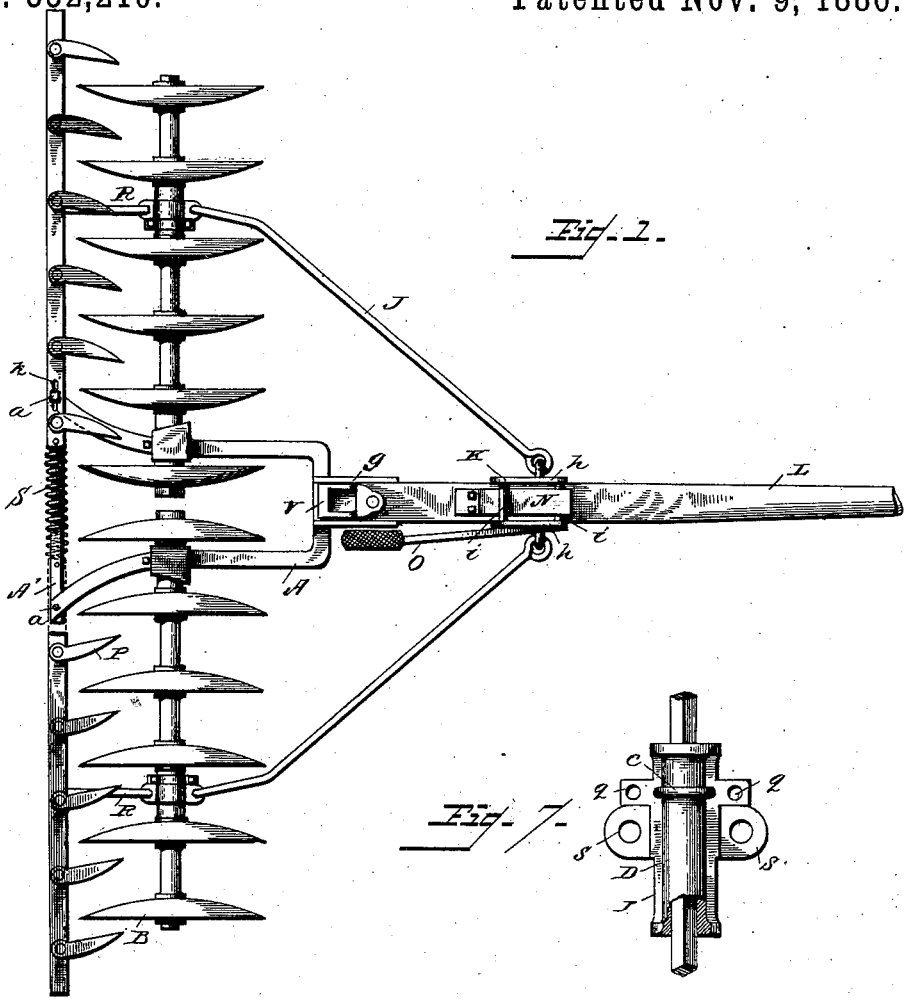
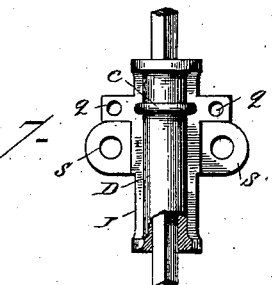
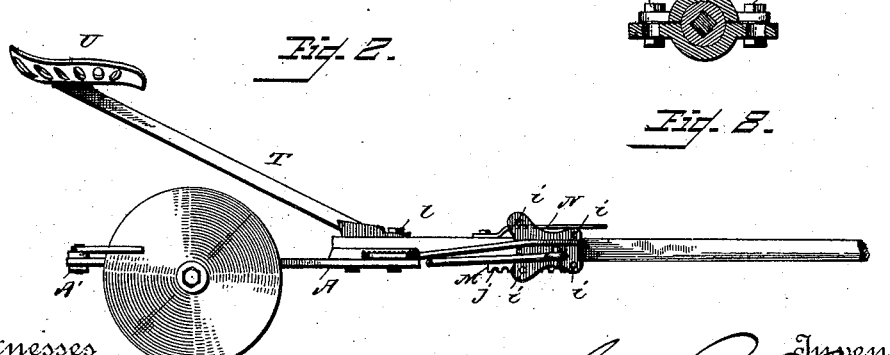
Witnesses
Inventor
George R. Thomson
By his Attorney (No Model.)
2 Sheets—Sheet 2.
G. R. THOMSON.
DISK HARROW.
No. 352,210. Patented Nov. 9, 1886.
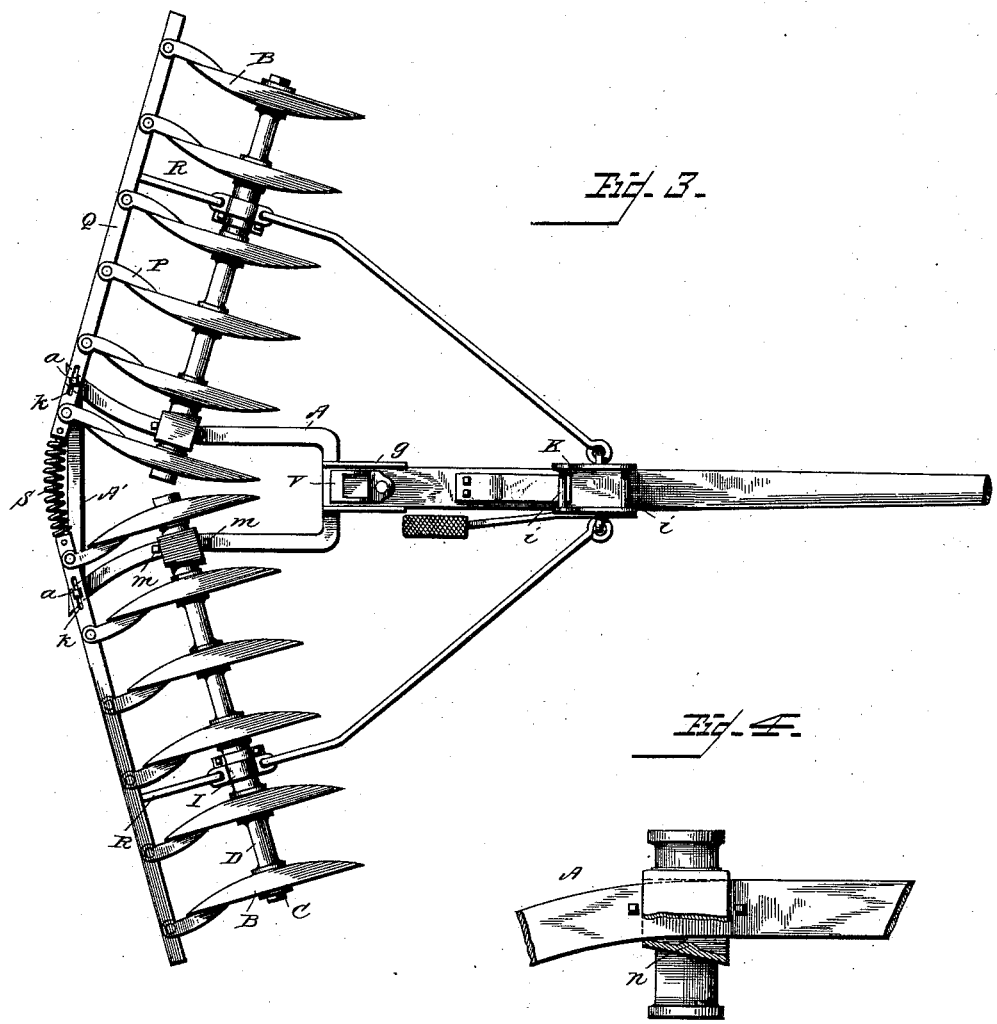
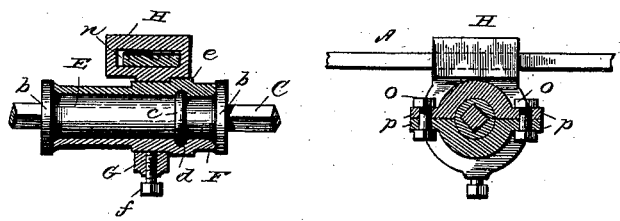

UNITED STATES PATENT OFFICE.

GEORGE R. THOMSON, OF GOUVERNEUR, NEW YORK.

DISK-HARROW.

SPECIFICATION forming part of Letters Patent No. 352,210, dated November 9, 1886.

Application filed June 17, 1886. Serial No. 205,469. (No model.)

*To all whom it may concern:*

Be it known that I, GEORGE R. THOMSON, a citizen of the United States, residing at Gouverneur, in the county of St. Lawrence and State of New York, have invented certain new and useful Improvements in Disk-Harrows; and I do hereby declare the following to be a full, clear, and exact description of the invention, such as will enable others skilled in the art to which it appertains to make and use the same.

My invention relates to disk-harrows, and has for its objects, first, to produce a harrow in which the side or end thrust of the disks is resisted when working at an oblique angle; second, in which the angle of the disks can be readily changed by backing or starting the horses; third, in which the scrapers can be thrown against the disks; and, further, to generally improve the construction and operation of such harrows; and to the accomplishment of such objects the invention consists in the construction and the combination of parts hereinafter particularly described, and then sought to be specifically defined by the claims.

Figure 1 is a plan of the harrow. Fig. 2 is a side elevation thereof. Fig. 3 is a plan with the gangs of disks set at an oblique angle to the tongue. Fig. 4 is a detail plan view of a part of the hanger and sleeve on an enlarged scale. Figs. 5 and 6 are respectively longitudinal and cross sections through the same. Fig. 7 is a detail of one of the boxes. Fig. 8 is a cross-section through the box.

In the drawings, the letter A designates a rectangular frame constituting a hanger, the sides and front of which are preferably made in one piece, while the rear ends of the sides may be connected together by a cross-bar, A', secured thereto by bolts *a*, or otherwise. The rear of the sides of the frame preferably curve outwardly or diverge from each other, as shown, so as to make the sides stronger and afford a better brace for the parts. This frame or hanger carries the gangs of disks and resists side or end thrusts of the gangs when they are working at an angle. The disks B of each gang are mounted on an angular shaft, C, and are held apart by spools or collars D, slipped on the shaft between the disks. The inner end of each shaft enters a journal, E, which turns in a sectional or two-part box, F. The journal is preferably formed with a flange, *b*, at each end to keep it from moving longitudinally in the box, and also with a collar, *c*, fitting in a groove, *d*, in the two-part box for the same purpose. The box may also be formed with a flange or collar, *e*, to lie against the side of the ring in which the box is secured. The box is secured within the ring G by a screw, *f*, passing through the ring and bearing against one section of the box, so as to clamp the box within the ring. The ring is supported from the frame A by a sleeve, H, preferably cast in one piece with the ring and fitting to the side of the frame or hanger. The opening in the sleeve for the passage of the side pieces of the hanger or frame is of any suitable form—square, oblong, or round—and of such shape as will permit the sleeve to turn or move horizontally, to admit of the horizontal adjustment of the gangs of disks to change their obliquity, and is also so much deeper than the thickness of the hanger or frame as to permit a slight vertical play or movement of the gangs. In the drawings the opening of the sleeve is illustrated as oblong and tapering or converging from the front rearwardly, so that the sleeves may turn and permit the gangs to move from a position at right angles to a position at an oblique angle to the line of movement of the harrow. The position of this sleeve is immaterial—that is, instead of being above the frame it may be below the frame, thus bringing the axle above, and instead of being directly over the axle it may be in front of or to the rear of it. The sleeve is prevented from sliding longitudinally on the frame by pins or bolts *m*, passed through the frame on opposite sides of the sleeve.

The axles or spools thereon, near the outer ends of both gangs, are provided with boxes I, with which are connected one end of the rods J, the other ends of which are connected to a sliding dog, K, moving on the tongue L, which is bolted to the plate *g*, connected to the frame or hanger A. The dog K may be of any suitable construction, but in the drawings is illustrated as composed of two side plates, *h*, fitting on opposite sides of the tongue, and connected together by cross pins or bolts *i*, arranged, preferably, so that one set will be nearer to the tongue than the other, thereby permitting the dog to tilt, so that when lifted up one of the lower pins will engage one of the notches $j$, formed in a plate, M, secured to the under side of the tongue, and thus hold the dog to its adjustment on the tongue. The dog is illustrated as held in engagement with the notched or ratchet bar by a spring, N, secured at one end to the tongue, and at the other end bearing against the dog, so as to lift it. When it is desired to release the dog, a foot-lever, O, secured thereto and within easy reach of the driver is depressed, when the dog is free to be adjusted, and as soon as pressure is relieved from the lever the spring throws the dog into engagement with the bar and locks it there.

I lay no claim herein to the rack secured to the tongue, a sliding dog pivotally connected to the tongue to engage with the rack, and rods connecting the dog to the gangs of disks, as the same forms the subject of my application filed September 29, 1886, Serial No. 214,869, and what is not herein claimed for the adjusting means is reserved to be claimed in said other application.

It is apparent that when the rods J are drawn forward the gangs of disks are drawn from a position at right angles to a position at an oblique angle to the tongue. This adjustment from one position to the other is readily effected when the dog is free by backing or starting the horses.

The scrapers P, made of spring-steel or other metal, are bolted to the scraper-bar Q, made in two parts, each part being connected near one end by a link or bar, R, to the box I, and at the other end pivoted or otherwise flexibly connected to the rear of the hanger or frame A, on which it rests. This connection to the frame may be made by the bolts $a$, the scraper-bar preferably being formed with slots $k$ for the passage of the bolts, and so as to permit some longitudinal play of the bars. The inner ends of the bars are connected together by a suitable spring—for instance, by a coiled spring, S—so that when the bars are drawn to an oblique position together with the disks the connecting-spring will draw the bars inwardly, so as to throw the scrapers against the faces of the disks, and thus remove adhering dirt therefrom.

The disks may be of any of the well-known forms.

The bar T of the seat U rests at its lower end in the bracket V, resting on the rear of the tongue, and secured thereto by the bolt $l$, which holds the bar to the tongue.

The several parts constructed and arranged as described form a simple, strong, and efficient harrow, wherein the adjustment or change of the disks from one position to another is readily effected, the end or side thrust is resisted, and the adhering dirt removed from the faces of the disks.

I have described what I consider to be the best construction of parts to effect the objects in view, but do not limit myself to the exact details illustrated, as departure from the details may be made without departing from the scope of my invention.

The sleeve H has a projection or stud, $n$, on its inner side wall to form a bearing or pivot, against which the hanger bears in any endthrust of the gangs and distributes the strain.

The two sections of the box F are held together by bolts $o$, passed through lugs or flanges $p$ on the two parts of the box.

The boxes L are formed with lugs $q$ for the bolts $r$, which secure the two parts of the box together, and with ears $s$, to which the rods R and J are respectively connected.

Having described my invention and set forth its merits, what I claim is—

1. The combination, with the gangs of disks, of the hanger composed of the horizontally-arranged rectangular frame A, having rigid sides diverging toward their rear, to which between their ends the gangs are connected, and the tongue connected to the front bar of the frame, substantially as described.

2. The combination, with the gangs of disks, of the hanger composed of the frame having the rear portion of its sides diverging and the gangs connected therewith, substantially as described.

3. The combination, with the gangs of disks and a hanger-frame, of sleeves embracing the sides of the frame and connecting the gangs thereto and formed with enlarged openings, to permit a lateral movement of the sleeves on the sides of the frame to obliquely adjust the gangs, substantially as described.

4. The combination, with the gangs of disks and a hanger-frame, of sleeves connecting the gangs and frame and movable upon the latter, and formed with openings enlarged vertically and transversely, to permit of the gangs moving vertically and horizontally, substantially as described.

5. The combination, with the gangs of disks and a hanger-frame, of sleeves movable upon the sides of the frame and having rings connected therewith to receive the axles of the gangs, substantially as described.

6. The combination of the gangs of disks, the hanger or frame, sleeves embracing the sides of the frame and connecting the gangs thereto, and movable laterally thereon, to permit of oblique adjustment of the gangs, the tongue and rods adjustably connecting the gangs with the tongue, substantially as described.

7. The combination, with the obliquely-movable gang of disks, of the sectional scraper-bar provided with scrapers, and a spring connected with the sections of the bars to throw the scrapers against the disks, substantially as described.

8. The combination of the gang of disks, the hanger-frame, a sleeve supported from the frame and movable thereon and having a ring connected therewith, a sectional box fitting within the ring and having the axle of the gang journaled therein, and means for holding the sections of the box in the ring, substantially as described.

9. A disk-harrow composed of the hanger-frame, the tongue connected thereto, the obliquely-movable gangs of disks, the sleeves connecting the axles of the gangs to the hanger, the scraper-bar made in sections connected together by a frame and connected with the hanger and gangs of disks, the adjustable dog to the tongue, and the rods connecting the gangs with said dog, substantially as described.

10. The combination of the hanger-frame, the gangs of disks, and the sleeves connecting the gangs of disks to the hanger-frame, said sleeve having studs to bear against the hanger-frame, substantially as described.

In testimony whereof I affix my signature in presence of two witnesses.

GEORGE R. THOMSON.

Witnesses:
BRADLEY L. BURNEY,
J. B. JOHNSON.